ASSOCIATIVE MEMORY WITH SEQUENTIAL MULTIPLE MATCH RESOLUTION

Filed Feb. 8, 1963 4 Sheets-Sheet 1

INVENTOR
ROBERT O. WINDER
BY
Samuel Cohen
Attorney

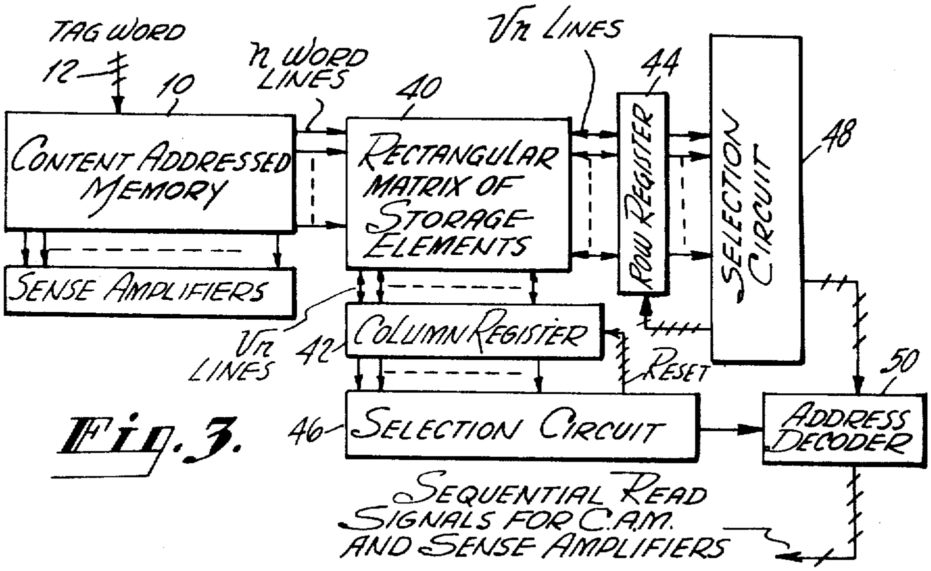
FIG. 3.
FIG. 4.
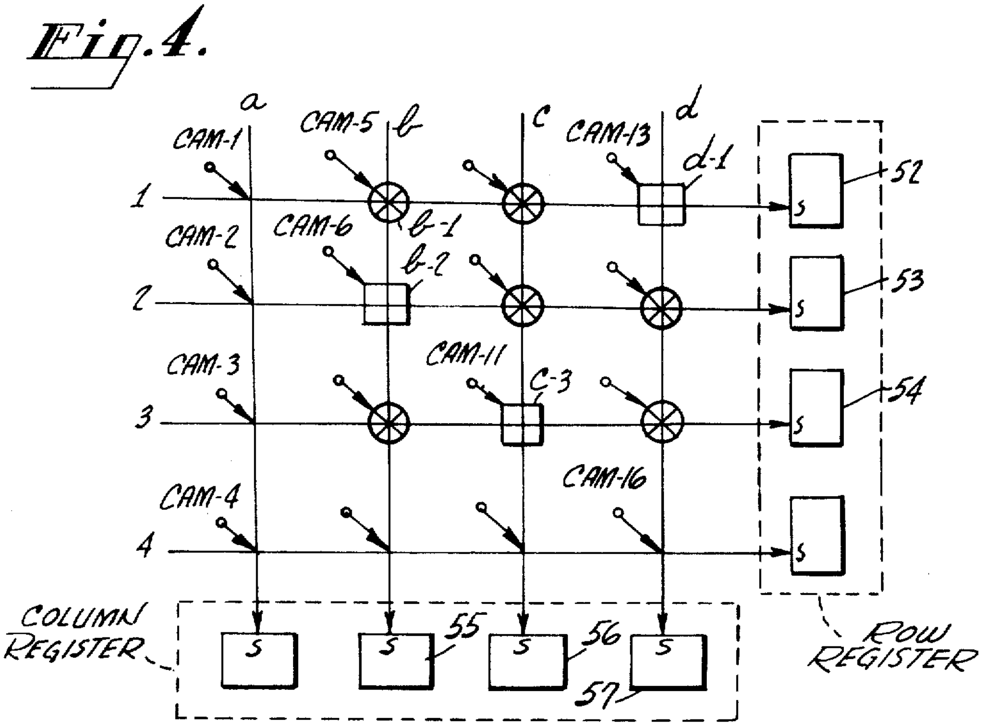
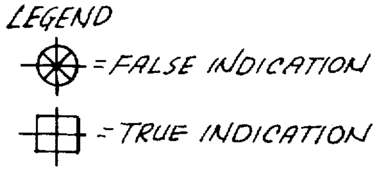
INVENTOR.
ROBERT O. WINDER
BY Samuel Cohen
Attorney INVENTOR.
ROBERT O. WINDER
BY
Samuel Cohen
Attorney INVENTOR.
ROBERT O. WINDER
BY
Samuel Cohen
Attorney 3,354,436
Patented Nov. 21, 1967

3,354,436

ASSOCIATIVE MEMORY WITH SEQUENTIAL MULTIPLE MATCH RESOLUTION

Robert O. Winder, Trenton, N.J., assignor to Radio Corporation of America, a corporation of Delaware Filed Feb. 8, 1963, Ser. No. 257,256
5 Claims. (Cl. 340—172.5)

The present invention, in its broader context, relates to the problem of determining the positions and the number of bits of a given value in a group of binary bits. The solution to the problem is of importance in a number of data processing applications. As one example, the invention is discussed in detail below, in terms of the problem of retrieving, in sequence, from a "content addressed" (sometimes also known as an "associative" or "catalog") memory system more than one item of information (more than one word) associated with an interrogating word known as a "tag" word.

In an embodiment of the system of the invention, a matrix of storage elements receives and stores signals indicative of the rows (addresses) in a content addressed memory containing words called for by a tag word. The storage elements of a column register are then set to indicate the columns of the matrix which store signals. The signals stored in the matrix are then read out, in sequence, as follows:

(1) The elements of a column of the matrix, which column corresponds to the most significant set stage of the column register, are read out into a row register.

(2) An address in the content addressed memory which corresponds to the most significant set stage of the column register and the most significant set stage of the row register, is read out and the most significant set stage in the row register is reset.

(3) Steps (1) and (2) are repeated until all stages in the row register are reset.

(4) The most significant set stage of the column register is reset.

(5) If there is still a stage in the column register which is set, steps (1)–(4) are repeated until all stages of the column register are reset.

Upon the completion of (5) the addresses of all of the words in the content addressed memory called for by the tag word have been read out.

The invention is discussed in greater detail below and is illustrated in the following drawings of which:

FIG. 3 is a block circuit diagram of another type of system for reading out a content addressed memory;

FIG. 4 is a schematic showing of one way in which the system of FIG. 3 may be operated;

In the following discussion, first the prior art and its problems are dealt with, then the solution of the present invention is outlined in conceptual terms. Following this, a more detailed discussion is given of an implementation of the present invention.

Figure 1:
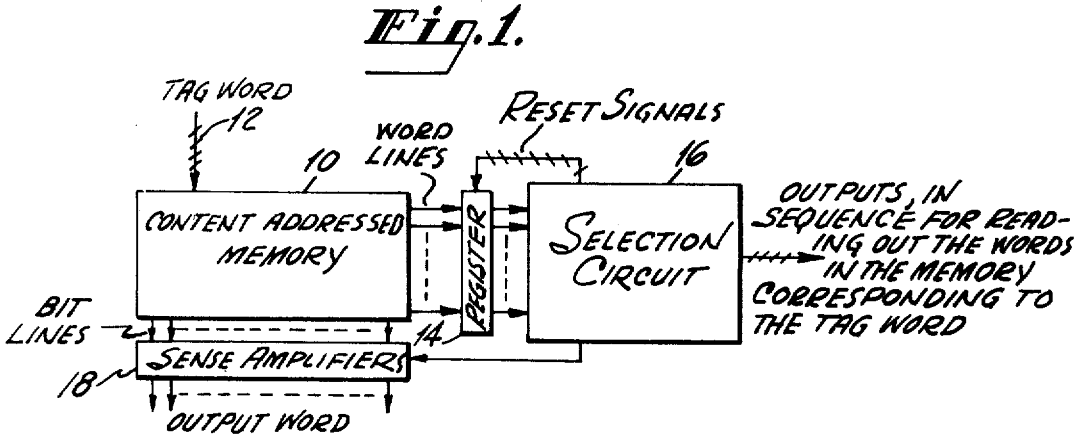
FIG. 1 is a block current diagram of a prior art content addressed memory read out system.

In the system shown in FIG. 1, block 10 represents a content addressed memory. This memory may be one such as discussed in detail in application Serial No. 52,143, filed July 30, 1962, by H. Weinstein and assigned to the same assignee as the present invention. However, the invention is not restricted to this particular memory configuration. In brief, the memory of the application includes a plurality of storage elements arranged in columns and rows. The word lines of the memory are the row lines and the bit lines are the column lines. Each word in the memory may be made up of a plurality of bits, as for example, 28, 64 or some other larger number, depending upon the particular content addressed memory involved. For the sake of the present discussion, it may be assumed that there are $m$ bits in the word, in which case there may be 2 $m$ columns in the memory. In a practical memory, the total number of words stored by the memory may be of the order of one thousand or ten thousand, but may be much larger than this as, for example, one hundred thousand or one million. For the sake of generality, it is assumed that there are $n$ words which can be stored in the memory and that there are $n$ word lines.

In the operation of the memory, a tag word is initially applied to bus 12. The tag word, in effect, asks the question: "Are there any words in the memory which have bits which correspond to the tag bits and are in the same position as the tag bits?" For example, the tag bits may represent the first, fourth and fifth characters in the license plate in which case the memory is asked to supply all the license plate numbers having these characters in these positions. The bus 12 to which the tag word is applied may have up to $m$ lines, where $m$ is the maximum number of bits in a word stored in the memory. For ease of illustration, the bus is illustrated as a single line crossed by short diagonal lines.

If there is a word in a particular row in the memory which corresponds to the tag word, a signal appears on that row line. There may be no, one, or more than one word in the memory corresponding to the tag word. In the latter case signals concurrently appear on more than one of the row lines and these signals must be converted to sequential signals which are fed back to the content addressed memory as sequential read out commands. The latter cause the words in the memory corresponding to the tag word to be read out, in sequence.

One possible solution to the problem is shown in FIG. 1. In this arrangement, the signals on the word lines are applied to the set terminals of a register 14. The storage elements of the register which are thereby set are hereafter termed "active" elements. A selection circuit 16 connected to the register 14 selects the active elements of the register in sequence and produces corresponding read out signals, also in sequence. For example, if the register is made up of $n$ flip-flops and the $2^0$, $2^4$ and $2^n$ flip-flops have been set, the circuit 16 functions to select first the $2^0$ flip-flop, then to skip the $2^1$, $2^2$ and $2^3$ flip-flops and select the $2^4$ flip-flop, and then to next select the $2^n$ flip-flop. Each time the circuit 16 selects a flip-flop, the circuit produces memory read out signals consisting of a "strobe" signal for the sense amplifiers. For example, when the $2^0$ flip-flop (which may correspond to the first line of the content addressed memory) is selected, a read out drive signal is applied to the first line of the content addressed memory. This drive signal causes the bits in the word on the first line of the content addressed memory to appear on the bit lines. Concurrently, each of the sense amplifiers 18 is strobed by the strobe signal so that an output word appears at the output of the respective sense amplifiers.

Figure 2:
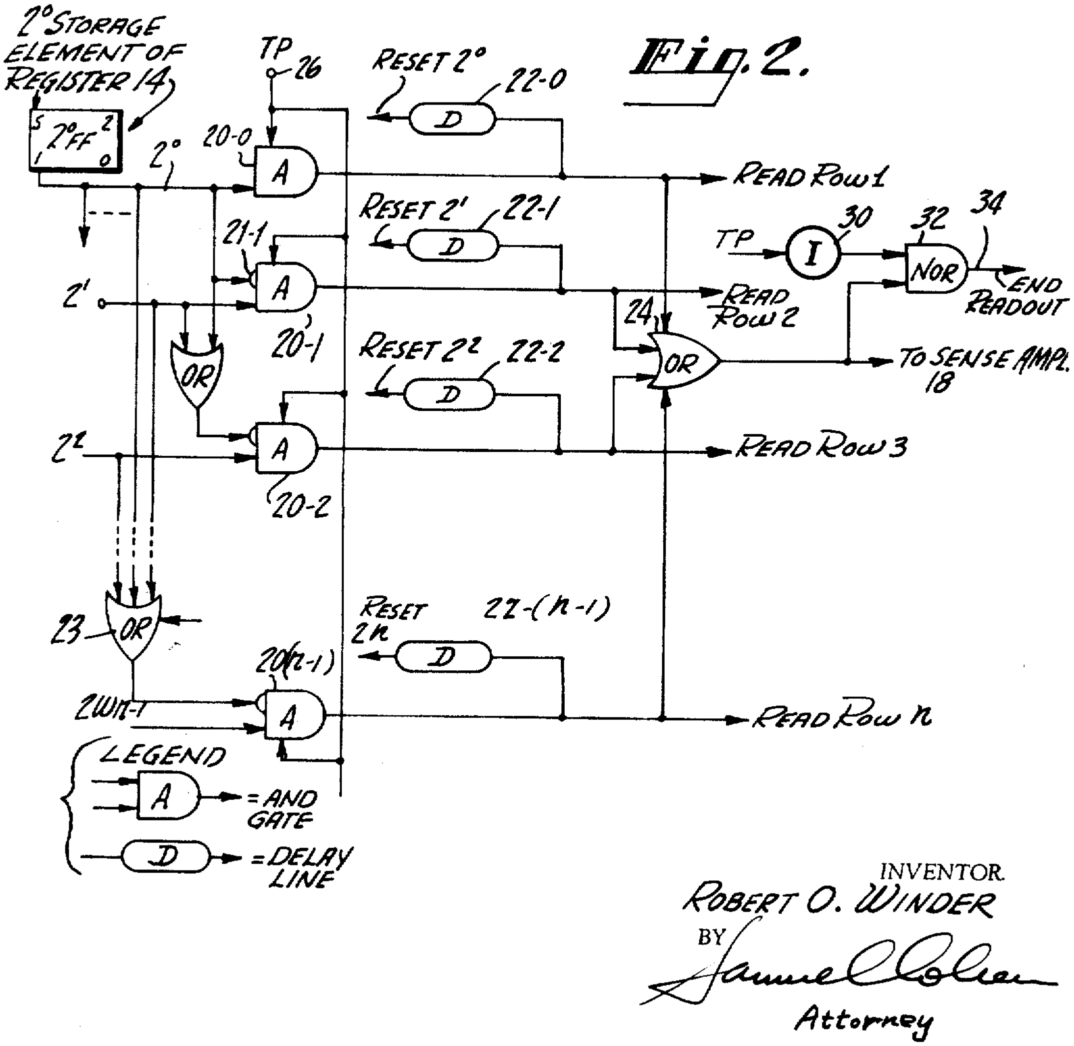
FIG. 2 is a block circuit diagram of one form of selection circuit which may be used in the system of FIG. 1.

A detailed showing of a selection circuit 16 appears in FIG. 2. The lines from the storage elements of the register 14 are legended $2^0$, $2^1$ . . . $2^{n-1}$ corresponding to the significance of the storage elements of the register from which these lines receive their signals. Each line is connected to the non-inhibit input of a different AND gate legended 20–0 through 30–($n$—1). Each line is also connected through OR gates to the inhibit terminals of all of the AND gates of higher significance than the AND gate to the non-inhibit input of which the line is connected. For example, the $2^0$ line is connected to the non-inhibit input of AND gate 20–0 and also to the inhibit terminal 21–1 and through OR gates to the inhibit terminals of all other AND gates. The output of each AND gate is connected back through its corresponding delay line 22 to the reset terminal of the storage element in the register associated with that line. The various lines are also connected to a common OR gate 24 whose output provides the strobe signal for the sense amplifiers 18.

In the operation of the circuit of FIG. 2, assume first that only the $2^0$ and $2^2$ lines come from active storage elements. This means that words corresponding to the tag word appear only on lines 1 and 3 of the content addressed memory. When the timing pulse TP is applied to terminal 26, it causes AND gate 20–0 to be enabled. Since the $2^0$ lead is an active lead (a binary "one" signal is present on this lead) all of the remaining AND gates receive a signal at their inhibit terminal and are inactivated. The output of AND gate 20–0 is applied as a read out signal to row 1 of the content addressed memory. At the same time, OR gate 24 produces an output which is applied to the sense amplifiers 18. Therefore, the word appearing on row 1 of the memory is read out. A short interval later, a pulse appears at the output of delay line 22–0, which pulse is applied to reset the $2^0$ storage element. Thereupon, the $2^0$ input line to AND gate 20–0 becomes inactive.

The next TP pulse which is applied to terminal 26 primes the various AND gates. However, the $2^0$ and $2^1$ lines carry a binary zero so that AND gates 20–0 and 20–1 do not become enabled. The $2^2$ line carries a binary one. Therefore, AND gate 20–2 does become enabled. OR gates, only one of which (23) is shown, apply disabling signals to the inhibit terminals of all AND gates of higher rank than AND gate 20–2. When AND gate 20–2 becomes enabled, its output causes the word stored in row 2 of the content addressed memory to be read out.

The process above continues until all of the storage elements in the register 14 have been reset. The following TP pulse applied to inverter 30 causes the NOR gate 32 to become enabled, and an "end read out" signal appears at lead 34. This end read out signal may be employed either to shut down the system or to cause the next tag word to be applied to the content addressed memory.

As is clear from FIG. 2, the circuit 16 for selecting the first active storage element consists of a relatively large number of logic gates. Further, the larger $n$ is, the greater the fan-in (the number of inputs) to the OR gates such as 23 and the others. While the circuit of FIG. 2 can be simplified to some extent, the entire system of FIG. 1 becomes somewhat unwieldy when there are a large number of rows in the content addressed memory. For example, even a small memory, such as one having one thousand lines, would require at least a thousand AND gates such as 20 plus other logic elements, such as shown in FIG. 2, associated with these AND gates.

A solution to the problem of simplifying the number of elements required in the selection circuit 16 is shown in block form in FIG. 3. What is done, in brief, is to employ a rectangular matrix of storage elements 40 rather than the linear array of elements as in register 14. When a tag word 12 is applied to the columns of the content addressed memory 10, concurrent signals are applied from the rows in the content addressed memory containing words which correspond to the tag words to the respective elements of the rectangular matrix which correspond to these rows. The storage elements of the matrix 40 may be any one of a number of different types. For example, they may be transfluxors, cores, flip-flops or other elements. For the sake of the present discussion, it is assumed that they are flip-flops which are initially reset. When a signal from the memory sets a flip-flop, the storage element in the column register 42 and the row register 44 which identify that flip-flop also become set (become "active"). There is a selection circuit 46 (like the one of FIG. 2) for selecting the first active element in the column register and a similar selection circuit 48 connected to the row register. These circuits select the active storage elements in the row and column registers in sequence and apply outputs to the address decoder 50. The latter produces the corresponding sequential read signals for the content addressed memory and the strobe signals for the sense amplifiers of the content addressed memory.

FIG. 4 shows, schematically, the rectangular matrix of storage elements 40. The elements themselves are not shown. However, it is assumed that one is present at each column and row wire intersection. The legend CAM followed by a number applied to a lead going to a column-row intersection indicates a connection from a row of the content addressed memory to the storage element at that intersection. For example, CAM–6 is a lead from row 6 of the content addressed memory to the location at row 2, column $b$.

A disadvantage of the system of FIG. 3 is that the information in registers 48 and 46 is sometimes factitious. For example suppose that there are words in rows 6, 11 and 13 of the content addressed memory which correspond to the tag word. Assume also, as already stated, that when the signals present on these lines are applied to the storage elements of the matrix 40, sense signals appear on the corresponding column and row leads of the matrix 40. In the present example, storage elements $b$–2, $c$–3 and $d$–1 of the matrix become set. This causes the flip-flops 52, 53 and 54 of the row register to become set and the flip-flops 55, 56 and 57 of the column register to become set. Therefore, even though there are only three active elements in the rectangular matrix 40 it would appear from the column and row registers that there are in fact 9 active elements.

In the operation of the system of FIGS. 3 and 4 it is necessary to separate the factitious indications from the true indications. This is done by first selecting the "first active" flip-flop in the column and row registers, for example 55 and 52, and causing drive currents to be applied to the column and row lines connected to these flip-flops, that is, row 1 and column $b$. The storage elements of the matrix, which are discussed in detail later, may be of the type which store information non-destructively They also have the characteristic that when interrogated in the manner described, if they contain a true indication, they produce an output signal and if they represent a factitious indication, produce no output signal. In the present instance, the memory element $b$–1 represents a factitious indication and therefore produces no output signal. The fact that no output signal is produced may be sensed by a sense lead, not shown, which passes through all memory locations. When no sense signal is received, the circuit 48 of FIG. 3 then selects the next flip-flop 53 and resets the first flip-flop 52 in the manner described above. The circuit 46 continues to select the flip-flop 55. Therefore, drive currents are next applied to column $b$ and row 2 to memory location $b$–2. The memory element at this memory location is truly an "active" element and produces an output signal. In response to this output signal, the address decoder 50 produces an output which is fed back to line 6 of the content addressed memory so that the word on line 6 of the memory is read out. The process continues in similar manner with the elements of the columns containing active elements being scanned in sequence.

The system described above has the advantage that the circuits 46 and 48 for selecting the first active element have fewer elements than would be required if a linear array of storage elements such as 14 were used. For example, in the case of a memory having one thousand lines, rather than requiring a thousand AND gates for the circuit of FIG. 2 the corresponding circuits 46 and 48 would each require only 100 AND gates. However, the disadvantage introduced is that the interrogation of the rectangular matrix of elements 40 may require a relatively long time, under worst case conditions. In the illustration of FIG. 4, even though there are only three words in the memory corresponding to the tag word, it requires the same amount of time to extract these words from the memory as if there were 9 words in the memory corresponding to the tag word. If T is the time required to extract one word from the memory and the memory capacity is $n$ words, under worst case conditions, if there are only $\sqrt{n}$ words in the memory which correspond to a tag word, it will still require $n$ time intervals T to extract these $\sqrt{n}$ words.

The system of the present invention superficially resembles the system shown in block form in FIG. 3. However, the logic and timing in the circuit is such that the problem of factitious indication elements is eliminated. In brief, when a tag word is applied to the content addressed memory 10, and the concurrent signals on the word lines are applied to the corresponding storage elements of the matrix 40, the row register 44 is maintained in a reset condition, and the first signals obtained from the matrix 40 are permitted to set only the storage elements of the column register 42. Thereafter, the circuit 46 for selecting the first active element is caused to apply a drive current to the column connected to that first active element. This drive current causes the elements of the rectangular matrix 40 in that column which are set to produce output signals which are applied via the row lines of the matrix 40 to the row register 44. Thereafter, the row register is read out by the circuit 48. After the elements of the row register have been read out, the first active element of the column register is reset and the circuit 46 selects the next column containing an active element, and the process described continues.

In the example chosen for illustration in FIG. 4, in which it is assumed that there are 16 lines in the content addressed memory, when the tag word is applied to the content addressed memory, only flip-flops 55, 56 and 57 are set. Thereafter, the selection circuit 46 senses flip-flop 55 and drives column $b$. This causes flip-flop 53 of the row register to become set. Thereafter, the circuit 48 selects flip-flop 53, and applies an output to the address decoder 50. The latter, which receives also a signal from flip-flop 55, causes an output to be produced for reading out line 6 of the content addressed memory. Shortly after this, flip-flop 53 becomes reset and flip-flop 55 becomes reset. The selection circuit 46 then selects flip-flop 56 and causes a drive current to be applied to column $c$. This causes flip-flop 54 to become set. The selection circuit 48 then selects flip-flop 54 and the address decoder 50 causes an output signal to be produced for reading out row 11 of the content addressed memory. The process continues until all of the words in the memory which correspond to the tag word have ben read out.

Figure 5:
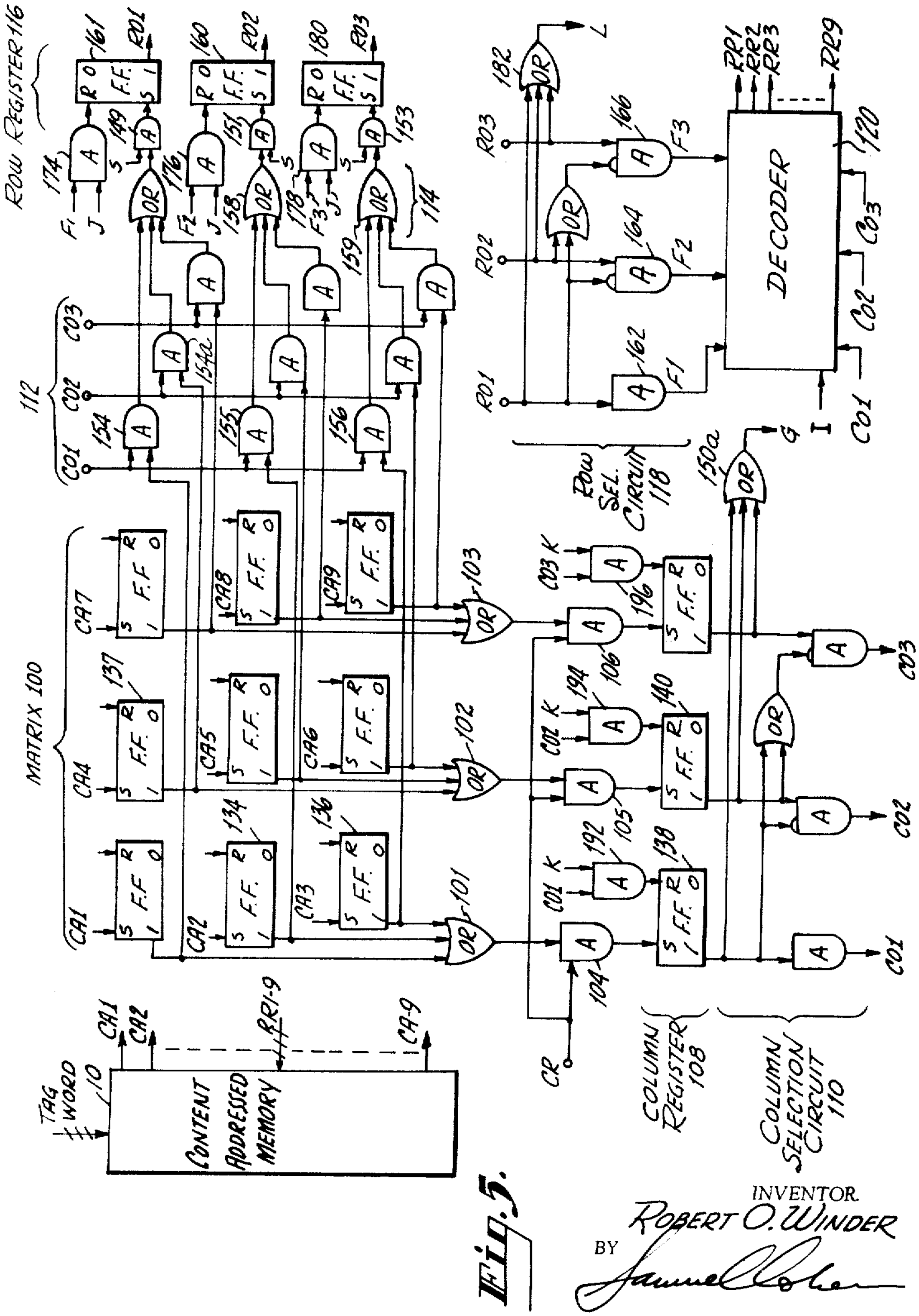
FIG. 5 is a block circuit diagram of one form of system according to the present invention.

The system of the invention is shown in more detail in FIG. 5. The content addressed memory shown at 10 is a single block. The content addressed memory is assumed to have 9 rows.

The signals CA–1 through CA–9, one or more of which may occur when a tag word is applied to the memory, are supplied to the 9 storage element matrix 100. The storage elements, for example, are flip-flops and they are arranged in columns and rows. The columns of the matrix are connected through OR gates 101, 102 and 103, respectively, and AND gates 104, 105 and 106, respectively, to the set terminals of column register 108. The "1" output terminals of the column register are connected to column selection circuit 110.

The rows of the matrix 100 are connected through AND gates 112 and OR gates 114 to the set terminals of row register 116. The "1" output terminals of the row register are connected to the row selection circuit 118 shown at the lower right of FIG. 5. The F outputs of the row selection circuit 118 and the C0 outputs of the column selection circuit 110 are applied to decoder 120.

Figures 6, 7:
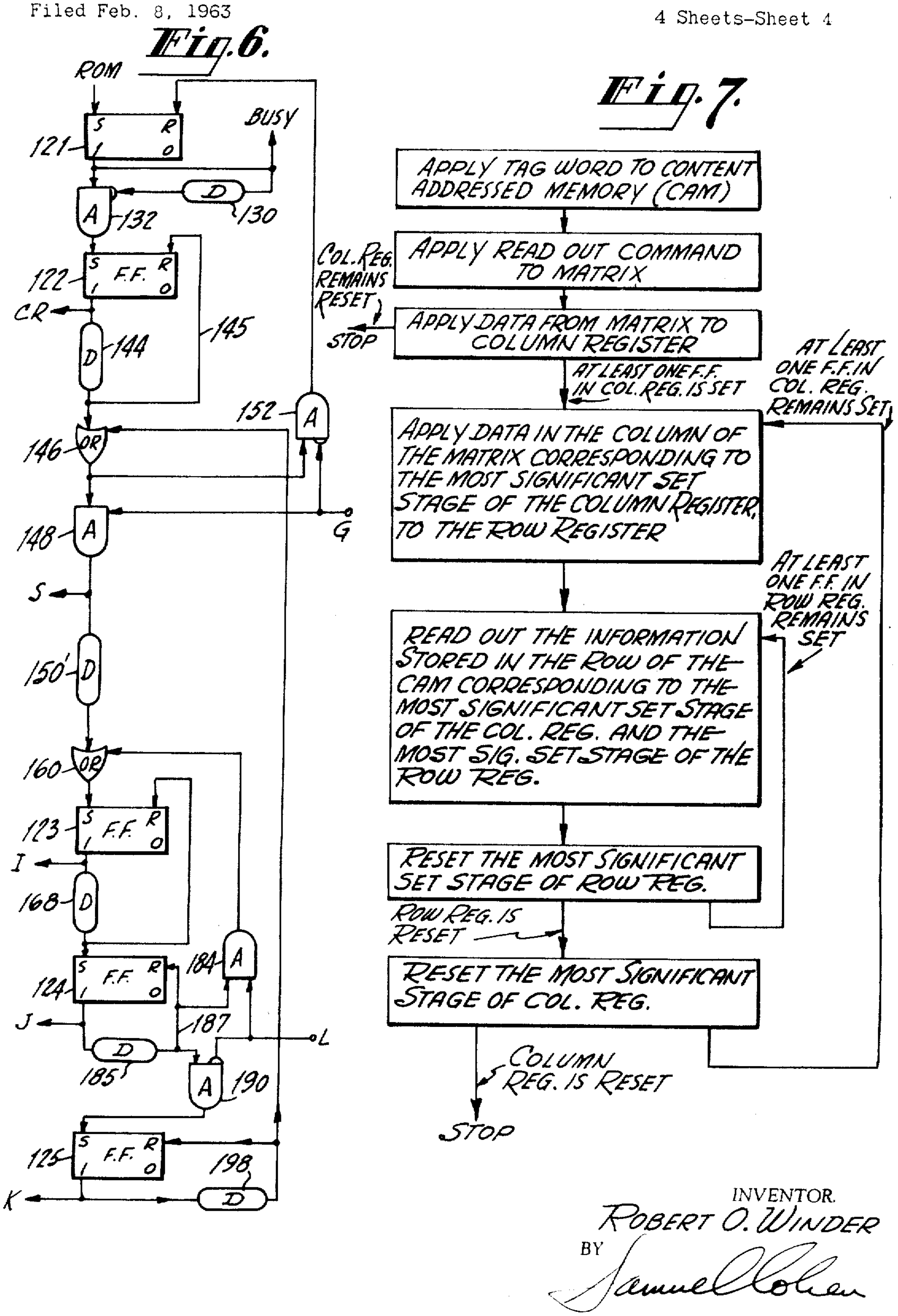
FIG. 6 is a block circuit diagram of the control stages of the circuit of FIG. 5.
FIG. 7 is a flow chart to illustrate the operation of the system of the present invention.

The control logic for the system of FIG. 5 is shown in FIG. 6. It includes flip-flops 121–125 interconnected through various AND gates, OR gates and delay lines in the manner discussed shortly. The stages of FIG. 6 receive the signals G and L from the system of FIG. 5 and an ROM (read out matrix) start signal from a separate source such as the control system (not shown) of a data processing machine (not shown).

In the operation of the system of the FIGS. 5 and 6, initially a tag word is applied to the content addressed memory. This causes one or more of the CA signals to be generated and the corresponding flip-flops of the matrix 100 become set. If there are no words in the memory corresponding to the tag word then all the matrix flip-flops remain reset.

When it is desired to obtain sequential read out signals RR from the system, the ROM signal is applied to the set terminal of flip-flop 121 (FIG. 6). The set flip-flop 121 generates a busy signal which is fed back to the data processing machine and indicates to the machine that the content addressed memory is in the process of being read out. AND gate 132 is enabled and flip-flop 122 is set. After the delay inserted by delay line 130 AND gate 132 becomes inhibited (this removes the signal from the set terminal of flip-flop 122). The CR signal generated by flip-flop 122 is applied to the AND gates 104, 105 and 106 of FIG. 5. This causes one or more of the flip-flops of the column register 108 to become set. For example, if words called for by the tag word are present in rows 2, 3 and 4 of the memory, the signals CA2, CA3 and CA4 are generated, and the flip-flops 134 and 136 and 137 of the matrix become set. The "one" outputs of these flip-flops pass through OR gates 101 and 102, and AND gates 104 and 105, respectively to the set terminals of flip-flops 138 and 140 of column register 108. If the third column of the matrix has no information present, flip-flop 142 of the column register remains reset.

When information is present in the column register 108, the column selection circuit 110 produces a "one" on one output line and a "zero" on all other output lines. In the present instance, flip-flops 138 and 140 of the selection circuit are set and therefore the output of the circuit is C01=1 and C02=C03=0. These signals C01, C02 and C03 are applied to the decoder 120 for later use as discussed shortly. In the meantime, the C01=1 output is applied to AND gates 154, 155 and 156 at the upper right of FIG. 5. If, as assumed, the flip-flops 134 and 136 of the matrix are set, the "ones" present at the outputs of these flip-flops pass through AND gates 155 and 156, respectively, and OR gates 158 and 159, respectively. (Flip-flop 137 is also set, however, as C02=0, AND gate 154$a$ is disabled and this prevents the output of flip-flop 137 from being applied to the row register 116). Later, when control signal S occurs, AND gates 151 and 153 become enabled and flip-flops 160 and 180 of the row register 116 become set.

Returning to FIG. 6, after the delay inserted by delay means 144, flip-flop 122 becomes reset via line 145. Concurrently, the delayed CR pulse is applied through OR gate 146 to AND gate 148. The second input to AND gate 148 is the G output signal of OR gate 150$a$ (FIG. 5). G=1 when one or more of the flip-flops in the column register 108 is set. It is assumed that flip-flops 138 and 140 of the column register are set and therefore AND gate 148 (FIG. 6) produces an output S which is applied as a priming signal to AND gates 149, 151 and 153 (all in FIG. 5). This causes flip-flops 160 and 180 to become set in the example assumed. The G=1 signal is also applied to the inhibit terminal of AND gate 152 (FIG. 6) disabling this AND gate. Therefore, flip-flop 121 remains set and the busy signal continues to be fed back to the computer.

The S signal of FIG. 6 is applied to delay line 150. The purpose of the delay inserted by line 150 is to permit sufficient time for the information present at the AND gates 149, 151 and 153 (FIG. 5) to flow through these gates into the row register and also to permit information to pass through the row selection circuit 118 and into the decoder 120. In the present example, flip-flops 160 and 180 of the row register are set so R02=R03=1 and R01=0. The row selection circuit 118 produces a "one" on one output line and a "zero" on all other output lines. In the present instance, line F2 is a "one" while F1=F3=0. The lines carrying the F signals are connected to the decoder 120.

Returning to FIG. 6, the S signal, after passing through delay line 150' and OR gate 160, sets flip-flop 123. This flip-flop generates the signal I=1 which causes the decoder to produce an output on one of its 9 output lines. The decoder is a known circuit and may include, for example, AND gates which receive different permutations of the F and C0 bits and which are primed by the I bit. In the present instance, the AND gate (not shown) in the decoder responds to the code C01=1, F2=1 and produces an output RR2. The RR2 signal is the read out command for row 2 of the content addressed memory. It is applied back to this row and also to the sense amplifiers of the memory of FIG. 3 in the manner indicated in the Weinstein application cited above.

The I signal produced by flip-flop 123, after the delay inserted by delay means 168, concurrently sets flip-flop 124 (FIG. 6) and resets flip-flop 123, which terminates the I signal. A J=1 signal now appears. This is applied to AND gates 174, 176 and 178 (FIG. 5) which are connected to the reset terminals of the row register 116. In the example, the second input (F2) to AND gate 176 is a "one" whereas F1 and F3 are "zero." Therefore, AND gate 176 becomes enabled and flip-flop 160 is reset.

The condition of the row register is now indicated by the signals R01=R02=0 and R03=1 (flip-flops 161 and 160 reset and flip-flop 180 set). Therefore, the row selection circuit now produces a new output, namely, F1=F2=0 and F3=1. Also, as R03=1, the L output of OR gate 182 is a "one." The purpose of the delay means 185 is to permit the conditions just described to become stable. After this delay, the J=1 signal which previously had been employed to prime the reset AND gates of the row register, appears on lead 187 and is applied to the reset terminal of flip-flop 124 (terminating J), and to AND gates 184 and 190. AND gate 184 of FIG. 6 thereupon becomes enabled, and the signals I and J are again generated. (AND gate 190 is inhibited by the L=1 signal.) The signal I causes the decoder 120 to produce another address in the content addressed memory—in this instance, the address RR3. The signal J resets the last set flip-flop 180 in the row register.

At this point R01, R02 and R03 are all "zero." When R01, R02 and R03 are all "zero," OR gate 182 (FIG. 5, right center) produces an L=0 output. This disables AND gate 184 (FIG. 6) and primes AND gate 190. Therefore, flip-flop 125 becomes set and a K=1 output is applied to the reset AND gates 192, 194 and 196 (FIG. 5). As C01 is a "one," flip-flop 138 becomes reset. However, as C02 is a "zero," flip-flop 140 remains set. Therefore, OR gate 150 still produces a G=1 output.

The K=1 signal is also applied through delay line 198 of FIG. 6 to the reset terminal of flip-flop 125. The delayed K signal is also applied to OR gate 146. The "one" output of the OR gate is applied to AND gate 148. The second input to the AND gate is G=1 so that a "one" is applied through delay means 150 and OR gate 160 to the set terminal of flip-flop 123. Thereafter, the cycle discussed above is repeated until the third address RR4 is read out of the decoder 120.

After the above occurs and after the J and K reset signals appear, OR gate 150 (FIG. 5) produces a G=0 output and OR gate 182 produces an L=0 output. The G=0 signal primes AND gate 152 (FIG. 6) and disables AND gate 148. The delayed K signal therefore passes through OR gate 146 and AND gate 152 to the reset terminal of flip-flop 121. This terminates the busy signal and all flip-flops in the control system of FIG. 6 are reset.

FIG. 7 is a flow chart illustrating the operation of the system of the present invention. The chart is self-explanatory.

The system of the invention has been stated to include a content addressed memory, a two dimensional array storing addresses in the memory, and a read out system for the two dimensional array which includes a column register and a row register. The number of stages in the selection system may be further reduced by employing a 3 dimensional array rather than a two dimensional array. With such a system, X, Y and Z registers are employed. The manner in which the array may be read out is similar to that already discussed. The total number of stages in the selection circuits is, of course, considerably smaller than that required with the 2 dimensional array.

The content addressed memory chosen for illustration is a fixed memory which includes diodes at the column-row intersections. It is to be appreciated that the invention is not limited to this particular memory or in fact, to a non-destructive memory. For example, the content addressed memory may have core storage elements rather than diodes. By the same token, while the rectangular (or 3 dimensional) matrix illustrated employs flip-flops as storage elements, other types of storage elements may be used instead. Again, transfluxors or cores or other elements may be used. In the destructive case, two storage elements per bit may be employed, one being read out into the row register and the other into the column register.

One final point which should be made is that it is possible with the system of the present invention to do what is known as compound searching rather than simple searching. A typical example of a compound search is to determine the words stored in the memory having, for example, less than a given value. In this type of search, the elements of the storage matrix are all initially set rather than being reset. The tag word applied to the memory causes certain of the elements of the matrix to become reset. Then, to narrow down the field of search, additional tag words continue to be applied to the memory until enough of the elements in the matrix are reset, so that the remainder can be handled conveniently.

What is claimed is:

1. An arrangement for determining the positions in a binary word of a group of bits of given value comprising, in combination, a matrix of storage elements equal in number to the bits in said word and arranged in columns and rows;

means for applying, in parallel, the bits in said word to the respective storage elements in said matrix;

a column register having a number of stages equal to the number of columns in the matrix;

a row register having a number of stages equal to the number of rows in the matrix;

means for concurrently sensing all storage elements in said matrix for concurrently setting the stages of the column register corresponding to the columns of the matrix storing bits of said given value;

means responsive to a given set stage of the column register for concurrently reading out the column of the matrix corresponding to that stage, into the row register, thereby setting at least one stage in the row register; and means for reading out, in time sequence, the respective set stages of the row register.

2. A system for reading out a content addressed memory comprising, (a) means for applying a tag word to the memory;

(b) a matrix of storage elements responsive to the memory for storing the addresses of the content addressed memory at which the words called for by the tag word are located;

(c) a column register;

(d) means for setting the stages of said column register which correspond to columns in the matrix storing addresses;

(e) a row register;

(f) means for setting the stages of said row register which correspond to the rows storing addresses in one column of the matrix, that column corresponding to one set stage of the column register;

(g) means for reading out an address corresponding to said one set stage of the column register and one set stage of the row register;

(h) means for thereafter resetting said one set stage of the row register;

(i) if at least one stage of the row register remains set, means including the means set forth in paragraphs g and h for repeating the operations called for in paragraphs g and h until all stages of the row register are reset;

(j) means for thereafter resetting said one set stage of the column register; and (k) if at least one stage of the column register remains set, means including the means set forth in paragraphs f–j for repeating the operations called for in paragraphs f–j until all stages of the column register have been reset.

3. In combination:

a content-addressed memory which contains more than one word which corresponds to a tag word;

means for applying a tag word to said memory for obtaining therefrom signals indicative of the addresses in the memory containing the words which correspond to said tag word;

at least a two-dimensional matrix of storage elements coupled to said memory for storing the addresses in the memory containing the words which correspond to the tag word;

means for driving solely the columns storing addresses of the matrix, in sequence, to obtain sense signals along the rows of the matrix;

means for reading out, each time a column of the matrix is driven, the rows of the matrix at which the sense signals are produced; and means responsive to said sense signals read out of said matrix for reading out, in sequence, the words in said content-addressed memory which correspond to said tag word.

4. The arrangement of claim 3 in which said storage elements comprise flip-flops.

5. In combination:

a content-addressed memory which contains more than one word which corresponds to a tag word;

means for applying a tag word to said memory for obtaining therefrom signals indicative of the addresses in the memory containing said words which correspond to the tag word;

a matrix of flip-flops arranged in columns and rows coupled to said memory for storing signals indicative of the addresses in the memory containing words which correspond to said tag word;

a gate at the output of each flip-flop;

means for priming, in sequence, and a column at a time solely, the columns of gates associated with the flip-flops storing signals;

means for reading out, each time a column of the gates is primed, those rows which produce signals in the matrix; and means responsive to the informtaion read out of said matrix for reading out, in sequence, said words in the content-addressed memory which correspond to a tag word.

References Cited

UNITED STATES PATENTS

| | | | |
|---|---|---|---|
| 3,134,095 | 5/1964 | Heath | 340—173.1 |
| 3,191,155 | 6/1965 | Seeber | 340—172.5 |
| 3,191,156 | 6/1965 | Roth | 340—172.5 |
| 3,195,109 | 7/1965 | Behnke | 340—172.5 |
| 3,199,082 | 8/1965 | Haibt | 340—172.5 |

FOREIGN PATENTS 1,307,396 9/1962 France.

OTHER REFERENCES

Kiseda et al.: "A Magnetic Associative Memory," IBM Journal, April 1961, pp. 106–121 and 115–121 of interest.

PAUL J. HENON, *Primary Examiner.*

I. S. KAVRUKOV, *Assistant Examiner.*